(12) United States Patent
De Meo

(10) Patent No.: US 6,769,870 B2
(45) Date of Patent: Aug. 3, 2004

(54) STRUCTURE FOR SEPARATING THE HIGH AND LOW PRESSURE TURBOEXPANDERS OF A GAS TURBINE

(75) Inventor: Roger De Meo, Florence (IT)

(73) Assignee: Nuovo Pignone Holding S.p.A., Florence (IT)

( * ) Notice: Subject to any disclaimer, the term of this patent is extended or adjusted under 35 U.S.C. 154(b) by 0 days.

(21) Appl. No.: 10/315,249

(22) Filed: Dec. 10, 2002

(65) Prior Publication Data

US 2003/0113207 A1 Jun. 19, 2003

(30) Foreign Application Priority Data

Dec. 10, 2001 (IT) .................................... MI2001A2584

(51) Int. Cl.[7] ............................................... F01D 1/02
(52) U.S. Cl. ..................... 415/199.5; 415/115; 415/116
(58) Field of Search .............................. 415/199.5, 115, 415/116

(56) References Cited

U.S. PATENT DOCUMENTS

| 4,173,120 | A | * | 11/1979 | Grosjean et al. ............... 60/791 |
| 4,213,738 | A | * | 7/1980 | Williams ....................... 416/95 |
| 4,292,008 | A | * | 9/1981 | Grosjean et al. ............. 415/115 |
| 6,217,279 | B1 | * | 4/2001 | Ai et al. ...................... 415/110 |
| 6,464,453 | B2 | * | 10/2002 | Toborg et al. ............... 415/115 |

* cited by examiner

Primary Examiner—Edward K. Look
Assistant Examiner—J. M. McAleenan
(74) Attorney, Agent, or Firm—Nixon & Vanderhye P.C.

(57) ABSTRACT

A structure for separating the high and low pressure turboexpanders of a gas turbine comprises a diaphragm (31) having the function of supplying flows of cooling air, a pair of shaped plates (50', 50") fixed to the diaphragm (31) and forming a gap (52) into which is blown cooling air which is drawn from a turbocompressor (11) and is then sent to hot areas of the turboexpanders, and a sealing ring (60) supported by the shaped plates (50', 50"), designed to isolate the high pressure (12) and low pressure (13) turboexpanders and to receive and distribute the cooling air obtained from the gap (52).

16 Claims, 9 Drawing Sheets

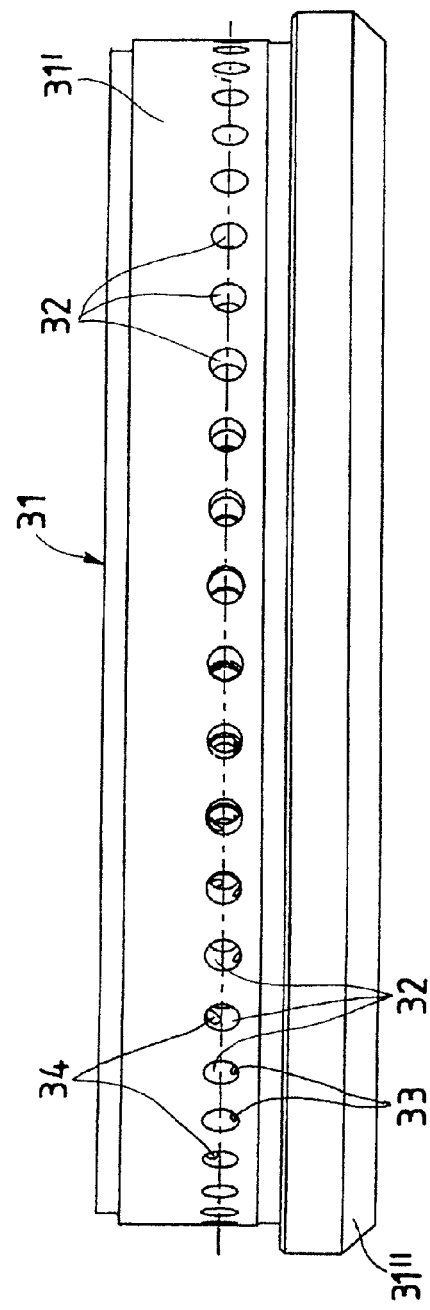

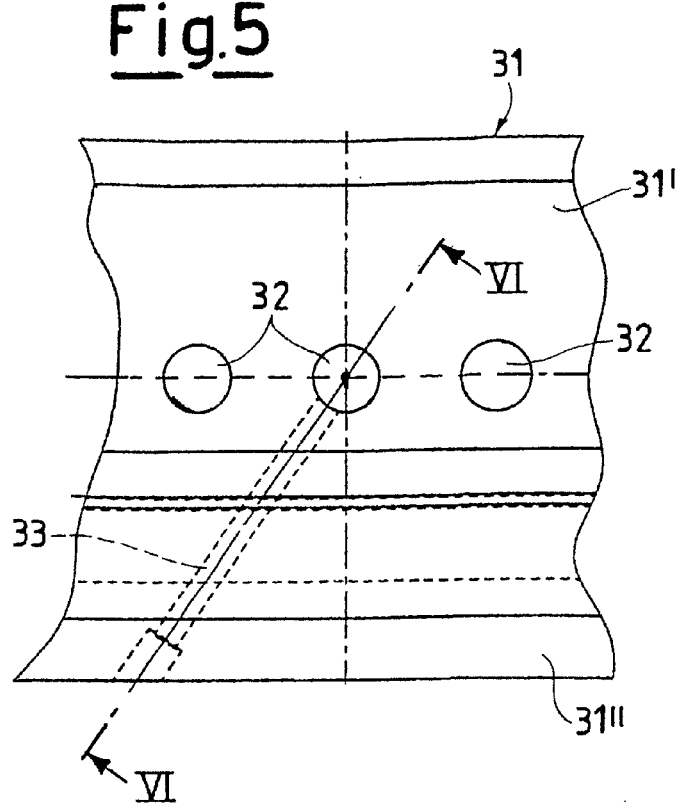
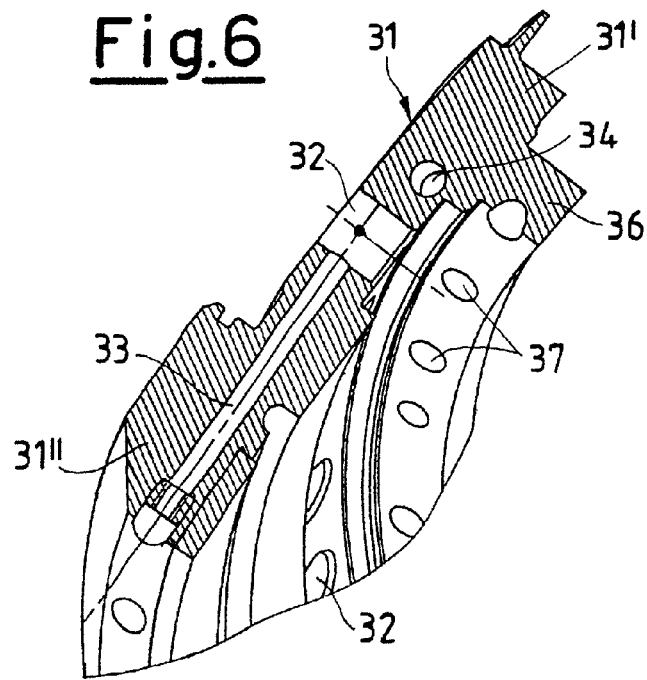

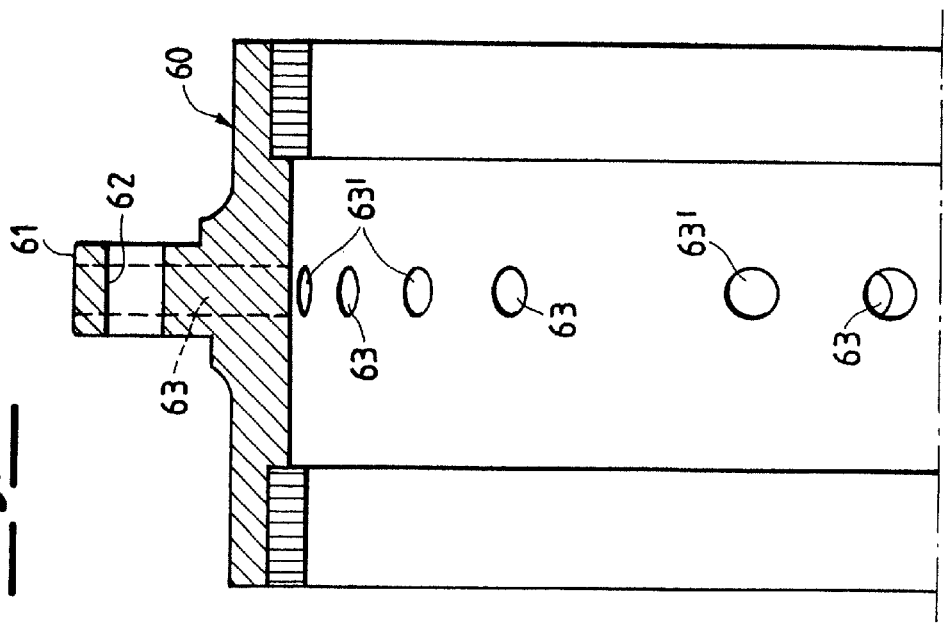
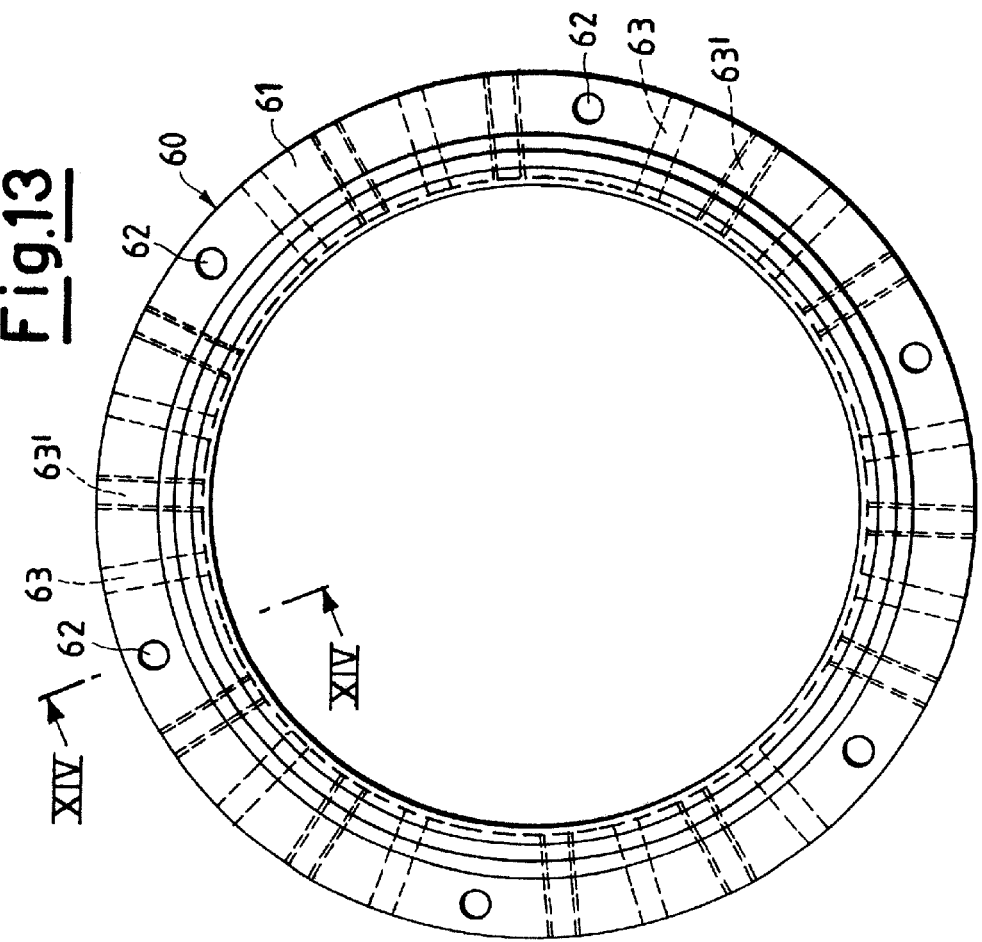

STRUCTURE FOR SEPARATING THE HIGH AND LOW PRESSURE TURBOEXPANDERS OF A GAS TURBINE

The present invention relates to a structure for separating the high and low pressure turboexpanders of a gas turbine.

In particular, the invention relates to a structure for separating the high and low pressure turboexpanders of a multi-stage axial gas turbine.

The term "gas turbine" denotes the whole of a rotary heat engine which converts the enthalpy of a gas to useful work, using gases obtained directly from a combustion process and supplying mechanical power on an output shaft.

The turbine therefore usually comprises one or more compressors or turbocompressors, in which air drawn from the outside is pressurized.

Various injectors supply the fuel, which is mixed with the air to form a fuel-air mixture for ignition.

The axial compressor is driven by a turbine, properly so called, or turboexpander, which supplies mechanical energy to a user by converting the enthalpy of the gases burnt in the combustion chamber.

The turboexpander, the turbocompressor, the combustion chamber (or heater), the output shaft for the mechanical energy, the control system and the starting system form the essential components of a gas turbine machine.

As regards the operation of a gas turbine, it is known that the fluid enters the compressor through a set of inlet ducts.

In these channels, the gas is characterized by low pressure and low temperature, but as it passes through the compressor the gas is compressed and its temperature rises.

It then enters the combustion (or heating) chamber, where its temperature is raised further.

The heat required to raise the gas temperature is supplied by the burning of liquid fuel introduced by injectors into the heating chamber.

Ignition is carried out by sparking plugs when the machine is started.

At the outlet of the combustion chamber, the gas, at high pressure and high temperature, passes through suitable ducts, reaches the turbine, where it gives up some of the energy accumulated in the compressor and in the heating (combustion) chamber, and then flows to the outside through the exhaust ducts.

Since the work transmitted by the gas to the turbine is greater than the work absorbed by the gas in the compressor, a certain quantity of energy remains in the shaft of the machine, and this work, after deduction of the work absorbed by the accessories and by the passive resistance of moving mechanical parts, constitutes the useful work of the machine.

Turbines designed for high power production are generally made with multiple stages to optimize the efficiency of conversion of the energy yielded by the gas into useful work.

Each stage of the turbocompressor and of the turboexpander is designed to operate in certain conditions of pressure, temperature and velocity of the gas.

From the science of thermodynamics it is also known that, in order to obtain the maximum efficiency from any given gas turbine, the gas temperature must be as high as possible, subject to compatibility with the materials that can be used for the components.

The operating conditions can therefore be particularly severe and can cause rapid deterioration of the turbine components in some areas.

In normal operating conditions of a turbine, the damage caused by the breaking of a component can have serious consequences, in addition to the stoppage of the machine for maintenance which is problematic in itself.

In the design of turbines, therefore, cooling systems are provided in critical areas, in order to prevent dangerous rises in temperature.

For example, air can be drawn off from an appropriate stage of the compressor and blown through a system of ducts into the critical area of the stage of the turboexpander for this purpose.

Another problem faced by designers is that of isolating the operating environments of the stages, both in the turboexpanders and in the turbocompressors.

In a turboexpander, for example, an effective isolation system must be provided to separate the high pressure stages from the low pressure stages.

To overcome the aforesaid problems, there is a known way of forming shields between turboexpanders operating and high and low pressure; these shields not only separate the environments, but also have the function of providing a passage for the cooling air to be sent to particularly hot areas of the turbine.

A gas turbine according to the prior art has a high pressure turboexpander AP and a low pressure turboexpander BP, illustrated schematically in FIG. 1 attached to the present description.

The turboexpanders, which operate at different pressures, are separated by a pair of convex plates 2 and 3 made in the form of a circular ring which has a convex surface and is fixed along its outer and inner circumferences.

These convex plates 2 and 3 are fixed and spaced apart in such a way as to form between them a duct 4 for carrying cold air towards the high pressure turboexpander through a set of outlets 5 formed in a central position in the duct 4.

The separating system according to the prior art which has been described has areas for the outlet of the cooling air only in the proximity of the high pressure rotor disc 6 and not in other critical areas of the stage.

Furthermore, the two convex plates 2 and 3 have a drawback in respect of their overall dimensions, which prevent the positioning of the high and low pressure rotors close to each other because they require the use of a transition element 7 between the two turboexpanders, resulting in a pressure drop and consequently a decrease in the efficiency of the turbine.

The object of the present invention is to provide a structure for separating the high and low pressure turboexpanders of a gas turbine, which is free of the drawbacks mentioned above.

Another object of the present invention is to propose a separating structure which enables cooling air to be directed towards hot areas within the gas turbine, such as the high and low pressure wheel housings and the high pressure rotor disc rod.

Another problem associated with turbines consists of the losses due to leakage between the high and low pressure environments.

These losses include a reduction of efficiency which, although less significant than other characteristic losses, such as the kinetic energy of the exhaust gas, friction in the ducts, the windage, etc., causes a departure from the optimal operating conditions of the turbine.

A further object of the present invention is to provide a support for the sealing ring which isolates the high and low pressure environments.

These and other objects, according to the invention, are achieved by the structure for separating the high and low pressure turboexpanders of a gas turbine as disclosed in claim 1.

Further characteristics of the separating structure according to the invention are specified in the subsequent claims.

The structure for separating the high and low pressure turboexpanders according to the present invention comprises a diaphragm for receiving cooling air drawn from a stage of a turbocompressor, a pair of shaped plates bolted at one end to the diaphragm, and a sealing ring bolted to the other ends of the shaped plates and supported by them.

The structure provides a separation between the high and low pressure stages and, because of the gap formed by the space between the shaped plates, allows the cooling air to be conveyed through the diaphragm towards hot areas of the turboexpanders.

Further characteristics of the present invention will be made clearer by the following description of one embodiment of the invention, provided by way of example and without restrictive intent, with reference to the attached schematic drawings, in which:

FIG. 4 is a lateral view of an element of the separating structure;

FIG. 5 shows a detail of FIG. 4;

FIG. 6 is a partial section taken through the line VI—VI in FIG. 5;

FIG. 13 is a front view of a further element of the separating structure according to the invention;

FIG. 14 is a section through the line XIV—XIV in FIG. 13.

Figure 1:
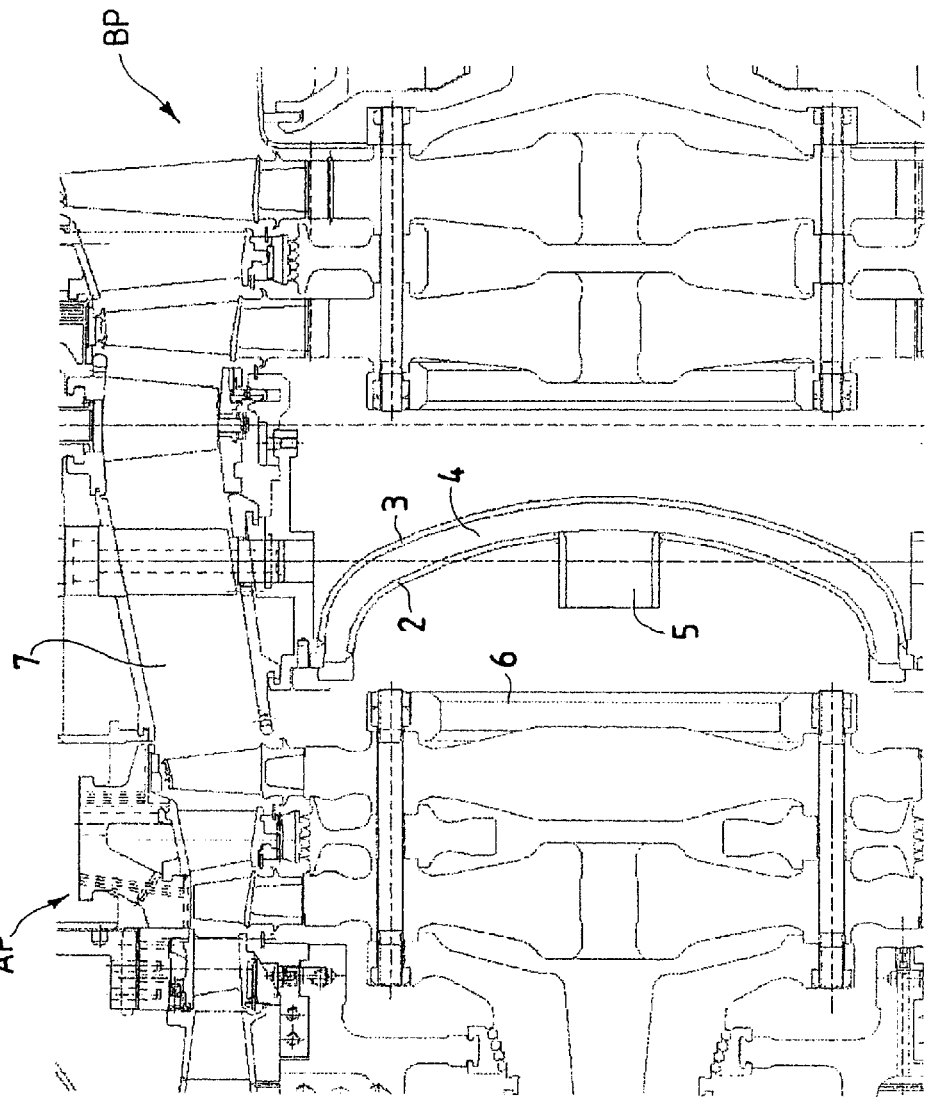
FIG. 1 is a partial schematic representation of a conventional type of gas turbine.
Figure 2:
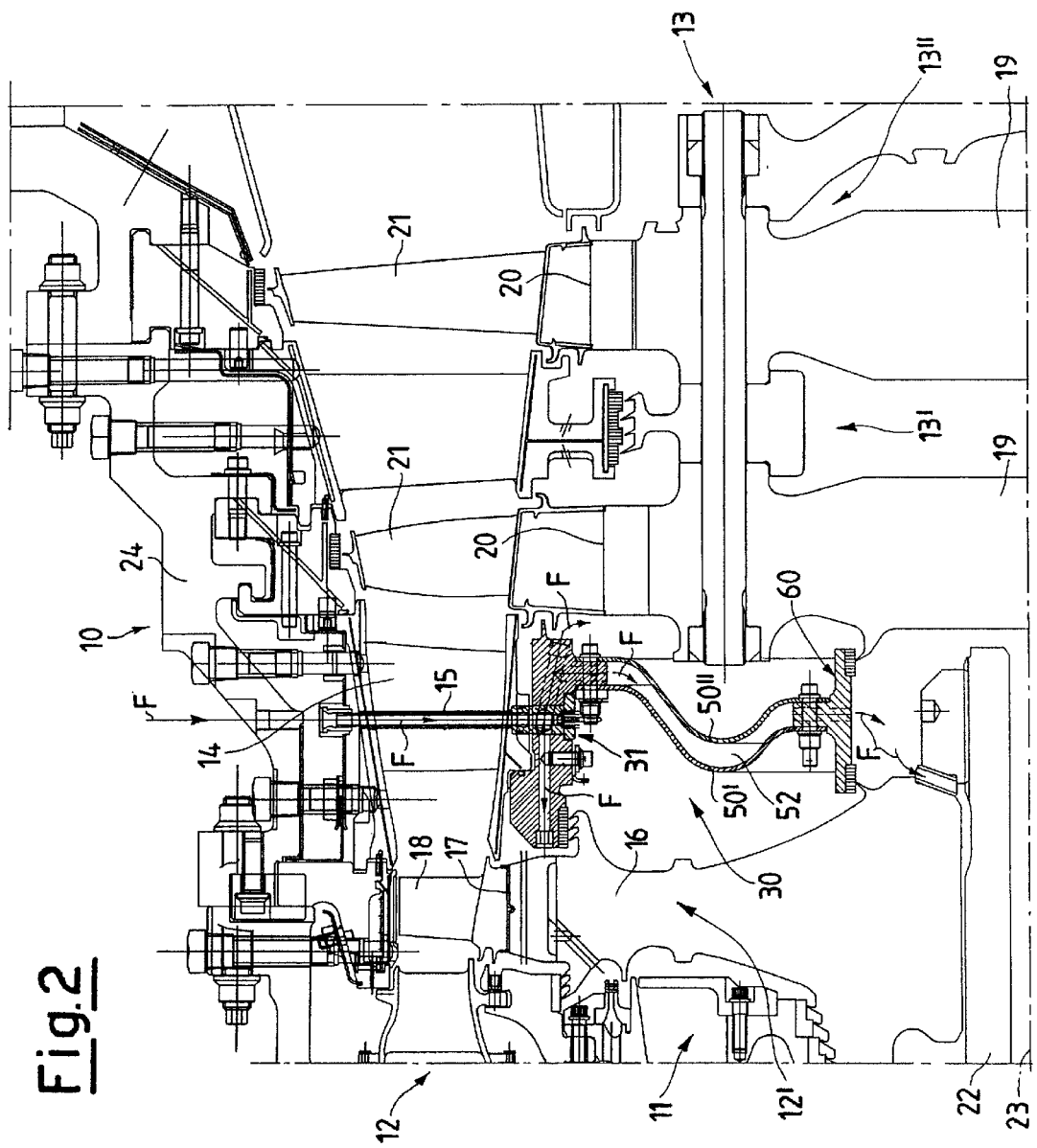
FIG. 2 is a partial schematic representation of a gas turbine comprising the separating structure according to the invention.
Figure 3:
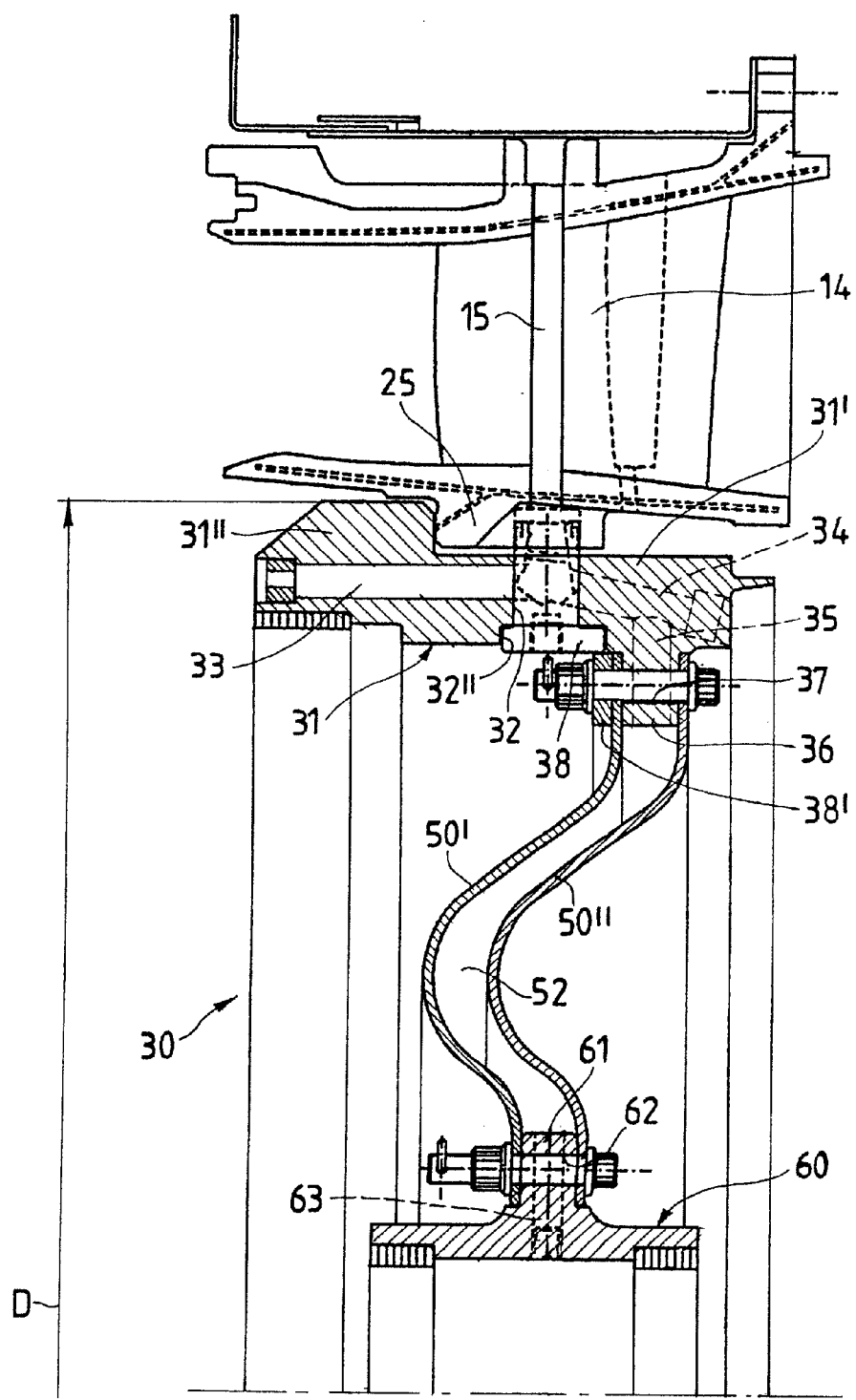
FIG. 3 is a sectional view through the separating structure according to the invention.

As shown in FIG. 2, a turbine 10 comprises a turbocompressor 11, a high pressure turboexpander 12 comprising a stage 12', and a low pressure turboexpander 13 comprising two stages, numbered 13' and 13", where the term "stage" denotes a rotor and stator assembly.

The turbocompressor 11 and the high pressure turboexpander 12 are mounted on a first shaft, while the two stages 13', 13" of the low pressure turboexpander 13 are mounted on a second shaft separated from the first (the shafts are not shown).

Both shafts are rotatable at different velocities about an axis 23 inside a casing 24 which forms the fixed part, or stator, of the turbine 10.

This configuration makes it possible to optimize efficiency since, in multi-stage turbines, the gas is processed in the high pressure turboexpander at a fairly high temperature and pressure, and undergoes a first expansion therein.

Subsequently, in the low pressure turboexpander, it undergoes a second expansion at a lower temperature and pressure than those of the preceding stage.

The energy obtained from the expansion of the gas in the high pressure stage 12' is used to move the turbocompressor 11, while the low pressure stages 13' and 13" are those which, in practice, supply the useful work.

The stage 12' of the high pressure turboexpander 12 comprises a disc 16 carrying a plurality of high pressure rotor blades 18 fixed by connections 17.

A central rod 22 located in the proximity of the axis of rotation 23 is used to keep the disc 16 in contact with the rotor of the turbocompressor 11.

Each of the stages 13' and 13" of the low pressure turboexpander 13 comprises a disc 19 carrying a plurality of low pressure rotor blades 21, fixed by connections 20.

The rotor blading of the stage 12' of the high pressure turboexpander 12 and of the first stage 13' of the low pressure turboexpander 13 form rotating ducts separated by a fixed duct or stator channel 14.

The high and low pressure turboexpanders 12 and 13 are separated from each other by a separating structure 30 which comprises a diaphragm 31, positioned coaxially behind the stator channel 14 and radially below the said stator channel.

The diaphragm 31 has the function of sending cooling air flows drawn from a suitably chosen stage of the turbocompressor 11 towards hot areas of the high and low pressure turboexpanders 12 and 13, in the directions shown by the arrows F in FIG. 2.

The separating structure 30 also comprises a pair of shaped plates 50' and 50", fixed to the diaphragm 31 and forming a gap 52 into which the cooling air is blown; and a sealing ring 60 supported by the shaped plates 50' and 50" and designed to isolate the operating environments of the high pressure turboexpanders 12 and the low pressure turboexpanders 13, to receive the cooling air from the gap 52 and to distribute it towards an area at critical temperature, consisting of the space between the rod 22 and the high pressure rotor disc 16.

With reference to FIGS. 3 to 10, the diaphragm 31 comprises an annular body 31' having, on its surface facing the stator channel 14, a plurality of radial holes 32 for the injection of the cooling air.

Each of the said radial holes 32, made to pass through the body 31', is made in order to fix the said diaphragm to a stator array of nozzles 15 which are closed by bushes 38 held in place by a fixing ring 38'.

The aforesaid bushes 38 receive the cooling ducts which pass through the nozzles and, by means of holes in the bushes, make these ducts communicate with the high and low pressure outlet ducts 33 and 34.

It is also possible to insert one or more control instrumentation terminals, as desired, into some of the radial holes 32 through their ends 32".

The body 31' of the diaphragm 31 comprises a circumferential stop 31" designed to bear against a corresponding projecting portion 25 formed in the nozzles 15 for the correct positioning of the separating structure 30.

The diaphragm 31 thus comprises a plurality of high pressure outlet ducts 33 directed towards the connections 17 connecting the high pressure rotor blades 18 to the disc 16, and a plurality of low pressure outlet ducts 34 directed towards the connections 20 connecting the low pressure rotor blades 21 to the disc 19.

Each of these high and low pressure outlet ducts 33 and 34 starts from a different radial hole 32 in the diaphragm 31 in directions which carry the flows of cooling air emitted by them towards the chosen critical areas.

In particular, the high pressure outlet ducts 33 are made in a horizontal configuration while the low pressure outlet ducts 34 are made in an inclined configuration.

Figure 7:
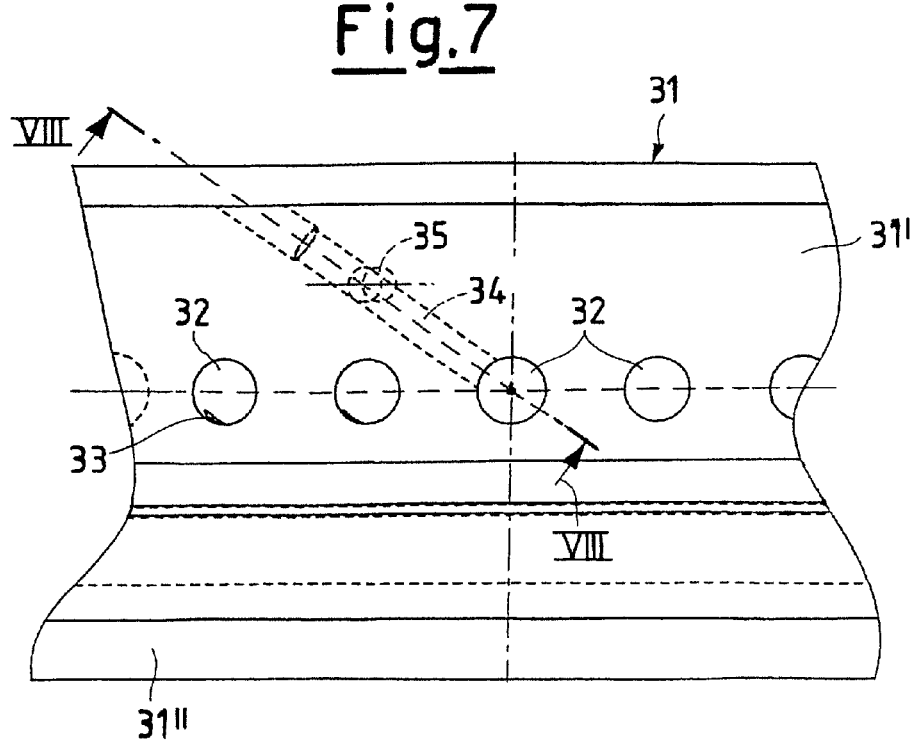
FIG. 7 shows a different detail of FIG. 4.
Figure 8:
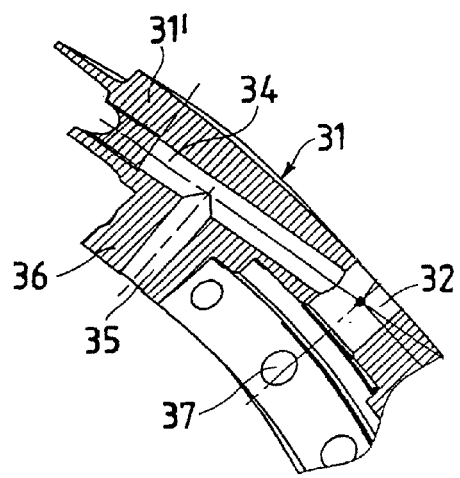
FIG. 8 is a partial section taken through the line VIII—VIII in FIG. 7.
Figure 9:
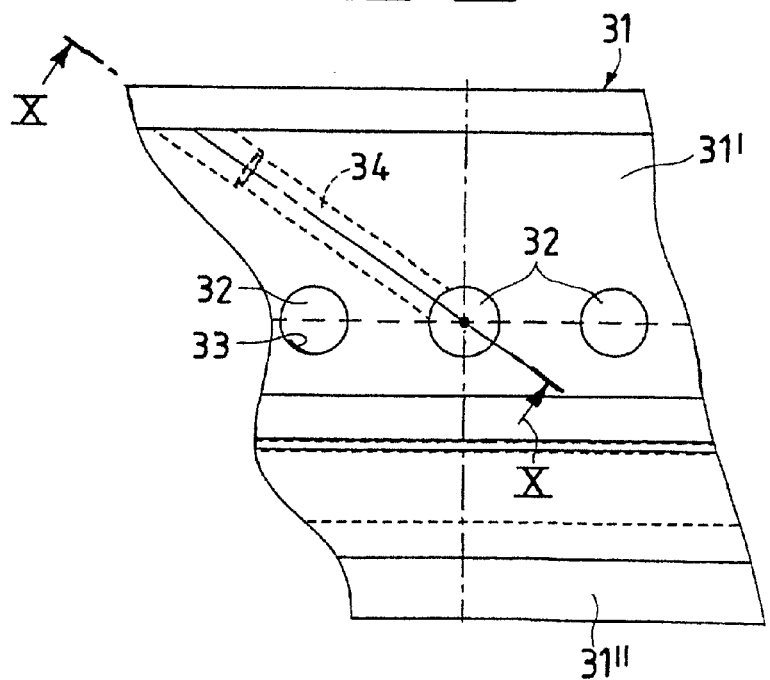
FIG. 9 shows a further detail of FIG. 4.
Figure 10:
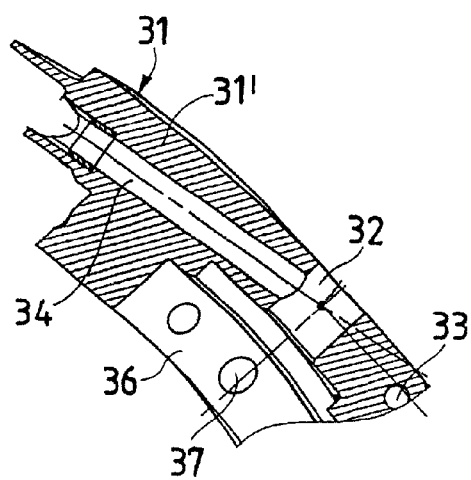
FIG. 10 is a partial section taken through the line X—X in FIG. 9.

As shown more clearly in FIGS. 5, 7 and 9, the high pressure outlet ducts 33 and the low pressure outlet ducts 34 are also oblique with respect to the longitudinal axis of the diaphragm 31 which coincides with the axis of rotation 23 of the rotors, in order to direct the flows of cooling air towards the critical areas which can be reached.

The number of high pressure outlet ducts 33 provided is twice the number of low pressure outlet ducts 34, and the ducts are positioned in a regularly alternating pattern, in which two high pressure outlet ducts 33 are followed by one low pressure duct 34.

In the preferred embodiment, a diaphragm 31 with a maximum diameter D, measured at the circumferential stop 31", of 477.88 mm, is provided with 48 radial holes 32 and accordingly with 32 high pressure outlet ducts 33 and 16 low pressure outlet ducts 34.

The diaphragm 31 has at least one connecting channel 35 connected to a low pressure outlet duct 34, in order to direct the flows of cooling air towards the gap 52.

Preferably, there are six connecting channels 35, passing radially through an inner ring 36 incorporated in the body 31' of the diaphragm 31 and extending towards the central axis 23.

The connecting channels 35 are positioned at unequal intervals along the circumference of the ring 36.

Figure 12:
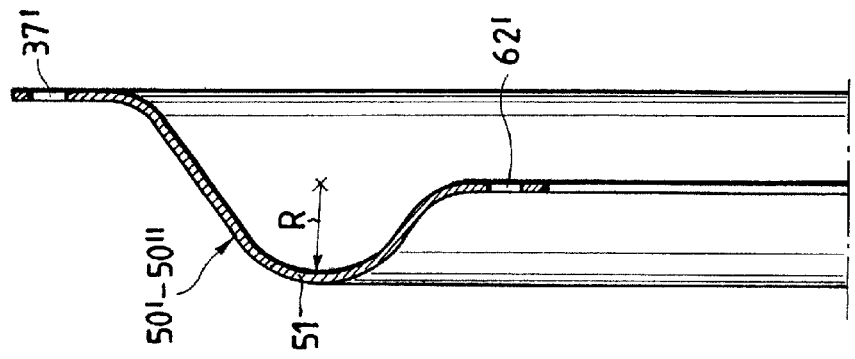
FIG. 12 is a section taken through the line XII—XII in FIG. 11.
Figure 11:
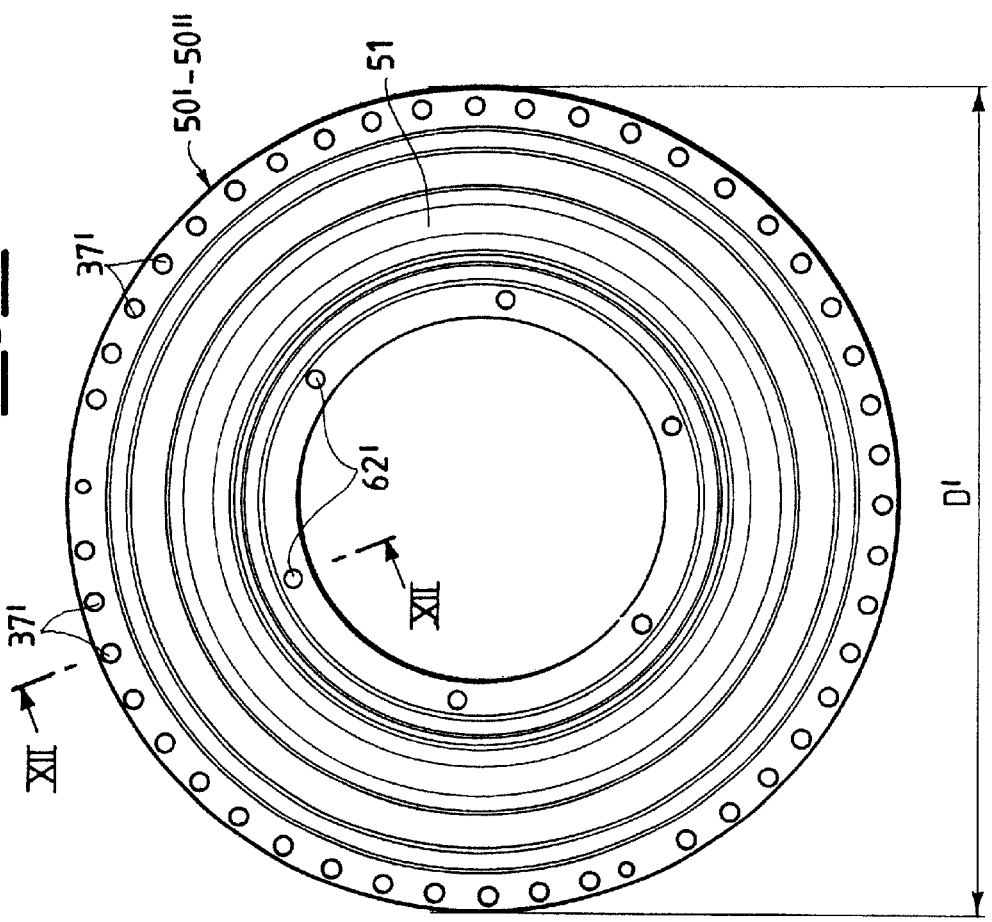
FIG. 11 is a front view of an element of the separating structure according to the invention.

With additional reference to FIGS. 11 and 12, each of the shaped plates 50' and 50" is made in the form of a circular, ring having a convexity 51 of identical curvature.

The shaped plates 50' and 50" are positioned radially with the convexity 51 facing the high pressure turboexpander 12, in such a way that they follow the profiles of the rotor discs 16 and 19 of the high and low pressure stages 12' and 13' respectively, between which the separating structure 30 is fitted.

In particular, the plate 50' faces towards the high pressure turboexpander 12, while the shaped plate 50" faces towards the low pressure turboexpander 13.

In one embodiment of the invention, the convexity 51 has a radius of curvature R of 23 mm, and is formed in shaped plates 50' and 50" having an external diameter D' of 417 mm, fixed to a diaphragm 31 having a maximum diameter D of 477.8 mm.

The inner ring 36 of the diaphragm 31 is provided with a plurality of fixing holes 37 positioned parallel to the longitudinal axis of the diaphragm 31, through which the said shaped plates 50', 50" are bolted to the diaphragm 31.

For this purpose, the shaped plates 50' and 50" are provided with holes 37' formed in the proximity of their outer circumference in such a way as to correspond to the said holes 37.

In a similar way, in order to enable the sealing ring to be fixed in the proximity of the inner circumference of the shaped plates 50' and 50", the sealing ring 60 has a circumferential edge 61, extending radially outwards from the upper surface of the sealing ring 60, this edge being pierced by a plurality of fixing holes 62, preferably six in number, whose axes are parallel to the longitudinal axis of the sealing ring 60.

The shaped plates 50' and 50" are provided with holes 62' positioned in the proximity of the inner circumference of the plates and suitably spaced to correspond to the fixing holes 62 made in the sealing ring 60.

The circumferential edge 61 is also pierced radially by a plurality of air ducts 63, preferably twelve in number, designed to receive the air from the gap 52 and to send it to the proximity of the annular rod 22.

The circumferential edge 61 also has holes 63' made in it, these holes being designed to increase, where necessary, the number of ducts available for the passage of the air.

These radial threaded holes 63' are normally closed by threaded plugs (not shown).

Thus the air drawn from one stage of a turbocompressor which has been suitably chosen on the basis of the pressure and temperature conditions reaches the areas of the high and low pressure turboexpanders which are at critical temperatures.

In the preferred embodiment of the invention, the draw-off stage of the turbocompressor is the seventh stage of an 11-stage turbocompressor.

The profile chosen for the shaped plates 50' and 50" enables the characteristics of rigidity of the separating structure 30 to be increased in such a way as to limit vibrational phenomena and ensure the correct positioning of the sealing ring.

The configuration of the shaped plates 50' and 50" enables the two rotors (which rotate at different speeds and operate in different pressure and temperature conditions) to be mounted close together, and therefore enables the transition element 7 to be dispensed with, while also helping to minimize the pressure losses.

The above description clearly reveals the characteristics of the structure for separating the high and low pressure turboexpanders of a gas turbine, according to the present invention, and also demonstrates its advantages.

Finally, it is clear that the separating structure according to the present invention can be varied in numerous other ways, without departure from the novel principles inherent in the inventive step, and it is also clear that, in the practical embodiment of the invention, the materials and dimensions used can be varied according to requirements and can be replaced by others which are equivalent in technical terms.

What is claimed is:

1. Structure for separating high and low pressure turboexpanders of a gas turbine, characterized in that it comprises:
   a diaphragm (31), positioned coaxially behind a stator channel (14) between a stage (12') of a high pressure turboexpander (12) and a first stage (13') of a low pressure turboexpander (13), having the function of sending flows of cooling air towards hot areas of the high and low pressure turboexpanders (12, 13);
   a pair of shaped plates (50', 50") fixed to the diaphragm (31) and forming a gap (52) into which the cooling air is blown; and
   a sealing ring (60) supported by the shaped plates (50', 50") and designed to isolate the high pressure turboexpanders (12) from the low pressure turboexpanders (13) and to receive and distribute the cooling air obtained from the gap (52).

2. Separating structure according to claim 1, in which the said diaphragm (31) comprises an annular body (31') having a plurality of radial through holes (32) for the injection of the cooling air.

3. Separating structure according to claim 2, in which each of the said radial holes (32) is used to fix the diaphragm to a stator array of nozzles (15) by means of bushes (38), each of which is held in place by a fixing ring (38').

4. Separating structure according to claim 3, in which the said diaphragm (31) additionally comprises a plurality of high pressure outlet ducts (33) directed towards connections (17) connecting high pressure rotor blades (18) to a disc (16) of the said stage (12') of the high pressure turboexpander (12).

5. Separating structure according to claim 4, in which the said diaphragm (31) additionally comprises a plurality of low pressure outlet ducts (34) directed towards connections (20) connecting low pressure rotor blades (21) to a disc (19) of the said first stage (13') of the low pressure turboexpander (13).

6. Separating structure according to claim 5, in which each of the said high and low pressure outlet ducts (33, 34) starts from a different radial hole (32) in the diaphragm (31).

7. Separating structure according to claim 6, in which the number of the said high pressure outlet ducts (33) provided is twice the number of the low pressure outlet ducts (34) and the ducts are positioned in a regularly alternating pattern with every two high pressure outlet ducts (33) followed by one low pressure outlet duct (34).

8. Separating structure according to claim 7, in which the diaphragm (31) has a maximum external diameter (D) of 477.8 mm, and has 48 radial holes (32).

9. Separating structure according to claim 7, in which the said diaphragm (31) also has at least one connecting channel (35) with the gap (52) for the distribution of the cooling air.

10. Separating structure according to claim 9, in which are formed six connecting channels (35) which start from the same number of low pressure outlet ducts (34).

11. Separating structure according to claim 5, in which the said shaped plates (50', 50") are made in the form of a circular ring having a circumferential convexity (51) facing the high pressure turboexpander (12), in such a way that they follow the profiles of the rotor discs (16, 19) of the high and low pressure stages (12', 13') respectively, between which the said shaped plates (50', 50") are fitted.

12. Separating structure according to claim 11, in which the said convexity (51) has a radius of curvature of 23 mm, and is formed in shaped plates (50', 50") having an external diameter (D') of 417 mm, fixed to a diaphragm (31) having a maximum diameter (D) of 477.8 mm.

13. Separating structure according to claim 2, in which the said diaphragm (31) incorporates in its lower part an inner ring (36) extending radially towards the longitudinal axis of the diaphragm (31), the said inner ring (36) being provided with a plurality of plate fixing holes (37) through which the said shaped plates (50', 50") are bolted to the diaphragm (31) in the proximity of their outer circumference.

14. Separating structure according to claim 1, in which the said sealing ring (60) has a circumferential edge (61) extending radially outwards from its upper surface, this edge being provided with a plurality of longitudinal holes (62) positioned parallel to the longitudinal axis of the diaphragm (31) for fixing to the said shaped plates (50', 50").

15. Separating structure according to claim 14, in which the circumferential edge (61) of the said sealing ring (60) is pierced radially by a plurality of air ducts (63), designed to receive the air from the gap (52) and to send it to the proximity of a central rod (22) which maintains the contact between the said disc (16) of the said stage (12') of the high pressure turboexpander (12) and a rotor of the turbocompressor (11).

16. Separating structure according to claim 15, in which 12 air ducts (63) are made through the said sealing ring (60).

* * * * *